July 5, 1966

T. E. COFFIN 3,258,899

APPARATUS FOR FRACTIONATING GASEOUS MIXTURES

Filed Feb. 6, 1962

Thomas E. Coffin, Inventor

July 5, 1966 T. E. COFFIN 3,258,899
APPARATUS FOR FRACTIONATING GASEOUS MIXTURES
Filed Feb. 6, 1962 3 Sheets-Sheet 2

Thomas E. Coffin, Inventor

July 5, 1966  T. E. COFFIN  3,258,899
APPARATUS FOR FRACTIONATING GASEOUS MIXTURES
Filed Feb. 6, 1962  3 Sheets-Sheet 3

Thomas E. Coffin, Inventor

United States Patent Office 3,258,899
Patented July 5, 1966

3,258,899
APPARATUS FOR FRACTIONATING GASEOUS MIXTURES
Thomas E. Coffin, South Orange, N.J., assignor, by mesne assignments, to Puregas Equipment Corp., a corporation of New York
Filed Feb. 6, 1962, Ser. No. 171,370
19 Claims. (Cl. 55—162)

The present invention relates to an apparatus for fractionating gaseous mixtures. Particularly, the present invention relates to an apparatus adapted to contain a fixed bed of solid subdivided contacting material surrounding an inner gaseous flow path for the fractionation of gaseous mixtures by adsorption means. More particularly, the present invention relates to a gaseous adsorption apparatus having a unique and completely internal gaseous flow path, which apparatus permits the continuous or intermittent segregation of one or more key gaseous components from a gaseous mixture feed stream by the alternating and cyclic adsorption and desorption of it or them at relatively high and low pressures. Still more particularly, the present invention relates to an apparatus of the kind described which effects a "heatless" fractionation of gaseous mixtures; that is, it effects fractionation with no intentional flow of heat to the apparatus from any exernal heat source nor from the apparatus to any external heat sink. Even still more particularly, the present invention relates to an apparatus having all of the aforementioned features which allows removal of moisture from air streams.

In the method of and apparatus for the "heatless" fractionation of gaseous mixtures as described particularly in U.S. Patent 2,944,627, issued July 12, 1960, to C. W. Skarstrom, the disclosures of which are incorporated herein by reference in their entirety, a feed stream comprising a mixture of gaseous components and containing one or more key components is introduced cyclically and in rapidly alternating sequence at a relatively high pressure into one end of each of one or more fixed bed fractionating zones. These zones each comprise a chamber vessel containing a bed of adsorbent material having a primary selective affinity for at least one key component of the gaseous mixture feed stream, e.g., a component regarded as a contaminant or impurity such as moisture, oil vapor, vaporous chemical degradation products, etc. During the passage of the original gaseous feed stream through one zone, the entire adsorbent bed thereof is maintained under substantially the relatively high pressure of the original feed stream. After passage through the zone, those gaseous components which have not been adsorbed are discharged as the gross primary effluent stream at the opposite or other end of the fractionating zone at substantially the original feed stream pressure.

At essentially the same time and usually prior to complete adsorptive saturation of the relatively high pressure zone, the adsorbent bed of one or more of the other fractionating zones previously on the relatively high pressure adsorption cycle is depressurized or placed on the desorption cycle by opening one end of the zone to a region of relatively low pressure such as the atmosphere. At substantially the same time that the pressure on this zone is reduced, at least a stream portion is withdrawn from the gross primary effluent stream discharged from the high pressure adsorption zone, and is introduced as a gaseous reflux stream into the opposite or other end of the reduced pressure zone to pass over and through the body of the adsorbent material therein, while the remaining net primary effluent stream is recovered at the other end of the high pressure zone for the purposes desired. Intermediate the two zones, the withdrawn gaseous reflux stream is passed through a pressure reducing device such as a regulating valve or an orifice. The flow of the withdrawn, relatively low pressure gaseous reflux stream through the zone on the desorption cycle is effected in countercurrent relationship to the flow of gas through this same zone on its previous adsorption cycle, yielding at the one end of the low pressure zone a gross gaseous secondary effluent stream comprising the reflux portion of the gross primary effluent stream and the gaseous components previously adsorbed at the relatively high pressure, and now desorbed from the adsorbent bed at the relatively low pressure, and which contains the key component in an increased concentration over the original gaseous feed stream.

Ia the conventional apparatus required for "heatless" fractionation as shown, for example, in FIG. 1 and FIG. 9 of U.S. Patent 2,944,627, there exists a series of external check valves and solenoid-operated flow switching valves, and external piping connected in fluid flow relation to an inlet and outlet manifold located one at one end and the other at the other end of the fractionating zones. In such conventional fractionating apparatus, the gaseous mixture feed stream inlet is commonly in fluid flow communication with and connected to an external inlet pipe at the one end of the adsorbent vessels with the net or product primary effluent stream being removed at the opposite or other end of the adsorbent vessels through an external outlet system comprising check valves and pressure reducing and regulating means in fluid flow communication by external piping.

Although such a structural arrangement has permitted satisfactory carrying out of the "heatless" fractionation process, it nevertheless creates numerous practical difficulties and problems in the maintenance, the servicing, and the construction cost of the prior art apparatus. For example, the Skarstrom apparatus does not admit of efficient access to or easy removal or repair of the adsorbent vessels, but instead requires the disconnecting and breaking of the external piping at one or the other or even both ends for these purposes. This procedure is time-consuming, and increases the opportunity for gaseous leaks. Additionally, repair or removal of the operating parts, such as the solenoid valves or the check valves, of the prior art apparatus frequently requires the breaking of the inlet air lines or other gaseous piping connections. The external arrangement of these solenoids, valves, and pipes is additionally disadvantageous in that it allows these items to be subject to rust and corrosion in certain atmospheres where the apparatus must operate, to be easily damaged, to be unsightly and detrimental to aesthetic values, to increase considerably the volume occupied by the assembled apparatus over that required by the operating parts taken by themselves, and to require excessive piping and connections, thereby increasing the cost of the apparatus as installed.

It is, therefore, an object of this invention to provide a compact and economical adsorption-type gaseous fractionating apparatus. Another object is to provide an adsorption-type apparatus which is free of execessive external piping, and which accordingly avoids many of the difficulties associated with external piping. A further object is to provide an apparatus of the kind described which may be readily serviced or repaired without the continual need to disconnect or break into an external gaseous flow path. It is also an object of this invention to provide a gaseous fractionating apparatus in which the moving and operative parts may be removed and repaired without disconnecting the inlet and outlet gaseous flow conduits. An additional object of the invention is to permit easy access to any adsorption zone by removal of the adsorption vessel thereof without the disconnection of the inlet and outlet gaseous flow conduits.

The nature and substance of this invention as well as its objects and advantages will be more clearly perceived and fully understood from the following description and claims read in conjunction with and with reference to the accompanying drawings wherein:

Figures 1, 3:
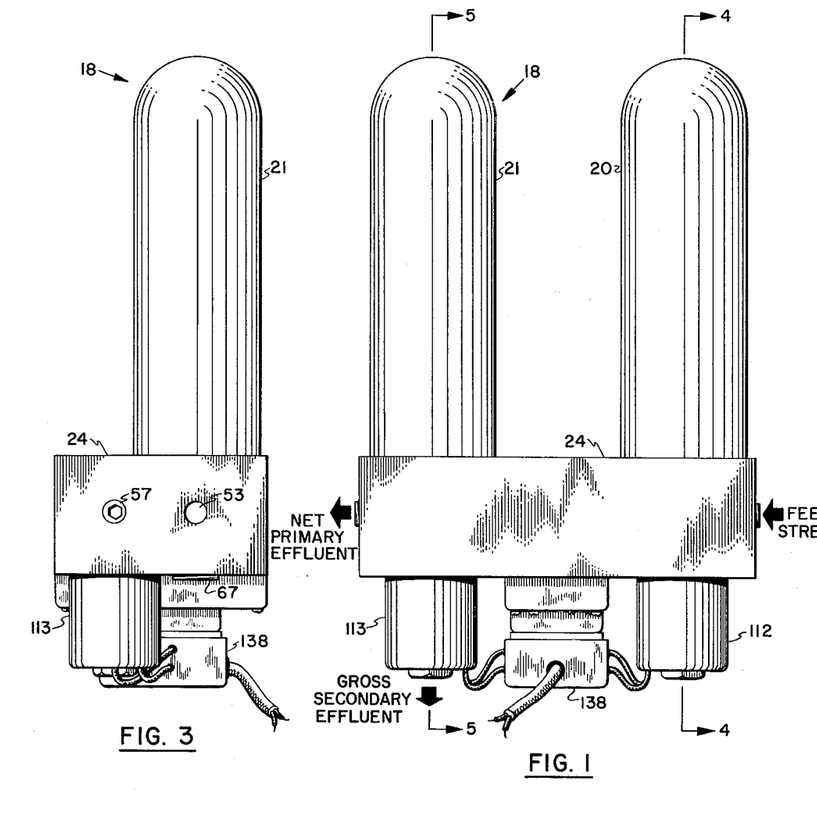
FIG. 1 is a front eelvation view of the preferred two-vessel apparatus embodiment of this invention designed to permit the continuous fractionation of gaseous mixtures.
FIGS. 2 and 3 are opposite end elevation views of the preferred two-vessel apparatus shown in FIG. 1.
Figure 2:
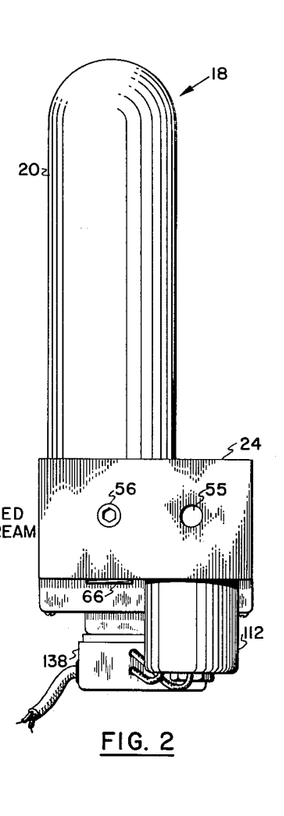

Referring now to the drawings in detail, there is shown in FIGS. 1, 2, and 3 a two-vessel fractionating apparatus 18 which is the preferred apparatus for providing continuous fractionation of gaseous mixtures. The following description is presented with reference to the preferred embodiment of the invention, although the inventive features can, of course, be utilized in a single vessel fractionating apparatus, such apparatus often including an accumulator chamber to receive the gross primary effluent stream; provide a source for the reflux stream, and allow for substantially steady flow of the net primary effluent stream.

Broadly, the instant fractionating apparatus comprises in combination two adsorption vessels mounted on a single manifold block having a particular porting arrangement, two power-operated valve means to provide for cyclic and alternating introduction and discharge of the gaseous feed stream and secondary effluent stream, two unidirectional gaseous flow control means to permit the discharge of the relatively high pressure gross primary effluent stream, two pressure reducing means to permit the countercurrent flow of the relatively low pressure reflux stream through the saturated adsorption zones, and a single timing means to provide for the proper valve operating sequence. In general, the following description is directed to all the drawings, with particular reference being given when required to specific figures thereof.

The adsorption vessels

Figure 4:
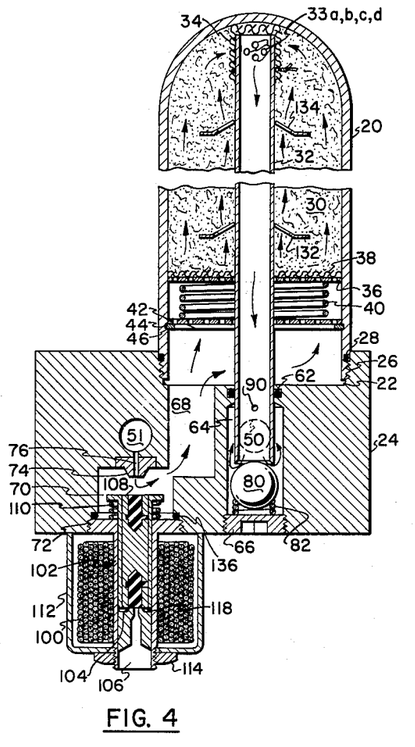
FIG. 4 is a sectional view of the preferred apparatus taken along line 4—4 of FIG. 1 showing certain internal structure of the apparatus together with the relative positions of certain operating parts and the gaseous flow path when one adsorption vessel is on its relatively high pressure or adsorption cycle.
Figure 5:
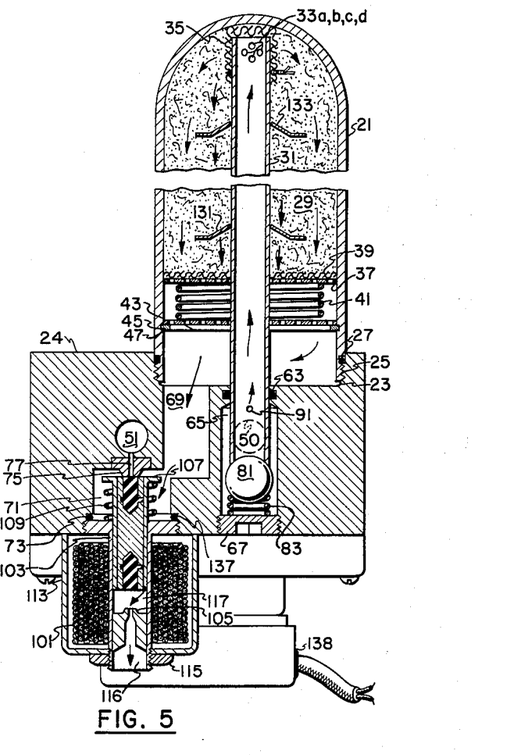
FIG. 5 is a sectional view of the preferred apparatus taken along line 5—5 of FIG. 1 showing certain internal structure of the apparatus together with the relative positions of certain operating parts and the gaseous flow path when the other adsorption vessel is on its relatively low pressure or desorption cycle.

Referring first particularly to FIGS. 4 and 5, there are shown two elongated domed adsorption vessels 20 and 21, detachably mounted in separate internally threaded recesses 22 and 23 in a manifold block 24 in a gas-tight manner by screw threads 25 and 26, and by two O-ring sealing gaskets 27 and 28 located above the threaded portions of the vessels. Within the two vessels are fixed beds of solid or semisolid subdivided adsorbent or contacting material 29 and 30, which beds are longitudinally traversed by central gaseous flow paths or inner tubes or conduits 31 and 32. The upper ends of the inner tubes are open and located at or near the upper ends or tops of the closed adsorption vessels. The upper inner tube walls are perforated with series of circumferentially spaced openings or perforations 33a, b, c, d, etc. Externally surrounding these perforations and also enclosing the open upper ends of the inner tubes are filter sleeves 34 and 35 of, for example, fine screen material or felt held in place by twists of wire. The inner tubes are firmly supported in the longitudinal portions within vessels 20 and 21 primarily by the packing of the surrounding adsorbent acting upon them and their illustrated radially extensive retaining devices described in greater detail hereinafter, and may be supported or positioned further, if desired, by physical contact of the upper tube ends with the inside top surfaces of domed vessels 20 and 21 or, for example, in larger type vessels by internal supporting struts or other bracing means.

The perforations near the upper ends of the inner tube or conduit walls may be of any suitable size or shape provided only that the total area of the openings for either conduit, together with the effective open area of the upper end of the conduit itself, is sufficient to allow the passage or flow of gases from and to the adsorbent and the interior of the inner conduit with no significant pressure drop, that is, for example with a pressure drop of less than one percent. Thus, the upper ends of conduits 31 and 32 may be either open and with or without wall perforations, or closed with wall perforations. The wall openings may be either rectangular, circular, elliptical, or indeed of any desired shape provided only that there is no significant pressure drop in the passage of either a relatively high or a relatively low pressure gaseous stream between the interior and exterior of the inner tubes. For example, it has been found that with air at pressures of about 30 to 100 p.s.i.g., six to ten circular openings of about 0.05 in. diameter near the upper end of a ¼ in. diameter inner tube, which is itself open at its upper end, are sufficient to prevent any significant pressure drop in the operation of the described apparatus.

It is, of course, recognized that the determination and calculation of the number and area of the openings to permit gaseous flow without a significant pressure drop are within the knowledge of a person skilled in the art. These calculations will depend upon the particular pressure flow rate, gaseous mixture, and other preselected operating conditions. For example, with air at a pressure of 30 to 100 p.s.i.g. and a flow rate of 1 to 10, e.g. 2 to 4, cubic feet per minute, six to twelve circular openings ranging from 0.04 to 0.08 in. diameter will normally be adequate to prevent significant pressure drop. Openings of larger than required area are to be discouraged, since large openings require additional filter sleeve material; decrease the strength of the upper tube walls, and increase the possibility of finely powdered adsorbent entering the inner conduits.

The perforations at the upper ends of the walls of inner conduits 31 and 32 may be spaced in any desired manner, although even distribution about the circumference permits the more even flow of gases without excessive degradation of the tube strength. The perforations must be restricted to the upper ends of the conduit walls, since perforations along the entire lengths of the conduit walls or a considerable part of them will allow the gaseous feed stream only rather short average longitudinal adsorption path lengths in the vessels, and thus prevent development of full efficiency of the fractionation process and the adsorbent material. In either inner conduit 31 or 32, the perforations should normally be confined to the upper twenty percent of the conduit length, or, preferably, the upper ten percent, or, more preferably, the upper five percent or less, e.g. two percent, of the tube length to permit the gaseous mixture to travel the maximum length of adsorption path before entering the inner tube.

Further conditioned only by the requirement of preventing a significant pressure drop in the gaseous flow path between the adsorbent and the interior of the inner or central tube or conduit, the openings may be spaced uniformly or nonuniformly, or graduated in size and in distance from each other, or may be fixed or adjustable in area of opening, or may be on one side only or circumferentially disposed about the whole upper ends of the inner tube walls.

Preferably the upper ends of the inner tubes are either in contact with or in close proximity to the domed tops of the adsorption vessels, e.g. within the upper five percent of the adsorption vessel lengths, to take advantage of the maximum available length of gaseous adsorption path within the vessels with the ends of the tubes open and circular holes circumferentially located within the upper five percent or less of the tube lengths.

The beds of adsorbent material 29 and 30 are firmly retained and supported within vessels 20 and 21 by the upper perforated metal retaining plates 36 and 37, the perforations of which are sufficiently large and numerous to permit essentially unrestricted gaseous flow therethrough. Resting on the upper surfaces of the upper retaining plates are filters 38 and 39 of, for example, a plastic impregnated felt, which filters function to remove contaminants from the gaseous feed stream and to retain any finely powdered adsorbent material within the vessels. The upper retaining plates are firmly supported against the adsorbent material by retaining springs 40 and 41, the lower portions of which rest on the lower perforated retaining plates 42 and 43 which are supported by retaining snap rings 44 and 45. The snap rings in turn are located in and by internal grooves 46 and 47 in the vessel walls. Both sets of upper and lower retaining plates and the filters 38 and 39 have corresponding circular openings through their center portions to permit the longitudinal snug passage of the inner tubes as shown. This arrangement also provides additional support to maintain the inner tubes in a firmly fixed upright position within each vessel. The adsorption vessel assemblies with their inner tubes projecting below the lower ends of the vessels themselves can then be readily detached from the manifold block simply by unscrewing them therefrom for substitution of adsorbent by replacement vessel assemblies of similar nature, or for repairs or access to the manifold block porting in at least apparatuses of the smaller sizes.

Shown in place on central conduit 32 in FIG. 4 are two radially extensive conduit retaining devices 132 and 134. Similar devices 131 and 133 are shown in place on central conduit 31 in FIG. 5. An isometric view of a portion of conduit 31 carrying retaining device 131 is given in FIG. 5A to provide additional illustration of the details of this device as representative of all devices 131, 132, 133, and 134. The particular conduit retaining devices illustrated are known commercially as "Speed Nuts." They are somewhat dish-shaped, and their radial prongs or spokes have spring-like properties in flexure. Radial or sector-shaped openings between the prongs allow gaseous material to flow through the devices in essentially unimpeded fashion.

Figure 5A:
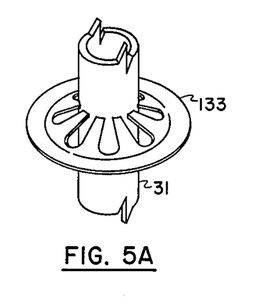
FIG. 5A is an isometric view of a portion of the central conduit and a radially extensive conduit retaining device mounted thereon of the apparatus of FIG. 5.

In application, a device such as device 131 is slipped over the end of a circular rod, shaft, or tube such as tube 31, and is pushed along the tube to the desired location. The bite of the inner ends of the radial prongs of the device allow motion of the device along the tube in one direction only. The subdivided material of absorbent beds 29 and 30 is, of course, packed closely in and around devices 131, 132, 133, and 134 in the absorption vessel assemblies, and any attempt to displace a central conduit such as conduit 31 downwardly with respect to the remainder of the assembly of which it is a part will be resisted by adsorbent material reacting against the undersides of retaining devices 131, 133 and any others on this conduit or inner tube, and these devices biting into and reacting against the tube itself. This reaction is useful to retain central conduits or tubes 31 and 32 in place in their adsorbent vessel assemblies when these assemblies are lifted from manifold block 24 and O-rings 63 and 62 in the block, these O-rings and their desired sealing action being described more fully hereinafter, tend to exert a downward drag on the central tubes.

The adsorption vessel assemblies particularly illustrated and described have numerous unique features and advantages. Considering either assembly, the disclosed structural arrangement definitely and compressively retains the subdivided adsorbent material within the vessel; permits the unrestricted flow of gases to and from the adsorbent bed, and allows for the removal of the adsorption vessel assembly complete with retained adsorbent.

Firm retention of the subdivided adsorbent within the adsorption vessel is especially important during operation of the apparatus in the course of which there are rapid gas flow reversals through the adsorbent material as it is switched from an adsorption cycle to a desorption cycle and then back to an adsorption cycle, etc. The considerable force of gases flowing through the adsorbent, applied at each cycle change in substantially shock load form, will cause an adsorbent which is not firmly retained to be displaced excessively and grind itself to a dust or powder. Such powdering of the adsorbent material tends to cause operating difficulties. Springs 40 and 41 should, accordingly, be sufficiently stiff and compressed as installed to hold essentially motionlessly against any gas force loads coming onto the adsorbent beds which they retain.

The preferred and most economical structural arrangement is the one shown in which each adsorption vessel is filled with adsorbent material all the way to its upper end from the perforated plate and filter supported by springs 40 and 41. If desired for any reason, however, it is apparent that an additional spring-type adsorbent retaining means can be provided within a vessel similar to vessel 20 or 21 at the upper end of the adsorbent bed which the vessel contains.

The manifold block

Figure 7:
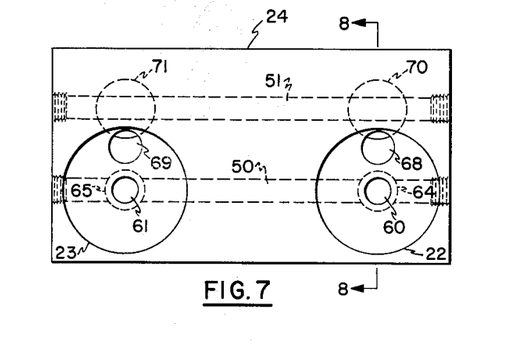
FIG. 7 is a plan view of a preferred two-vessel manifold block showing the porting arrangement within the block.
Figure 8:
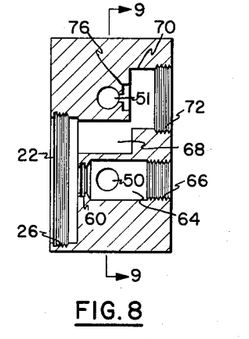
FIG. 8 is a sectional view of the manifold block of FIG. 7 taken along line 8—8 therein.
Figure 9:
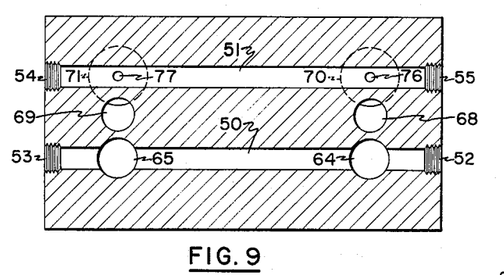
FIG. 9 is a sectional view of the manifold block of FIG. 8 taken along line 9—9 therein.

Referring next particularly to FIGS. 7, 8 and 9, there is shown the ported manifold block 24, which is characterized by a unique arrangement of cast, drilled, molded or otherwise formed passages and recesses.

The manifold block is characterized by an outlet passage 50 and an inlet passage 51, both of which extend through the entire block to threaded openings 52, 53, 54 and 55 at the ends of the block. Neither the inlet nor the outlet passage is in direct gaseous communication with each other. The outlet passage serves to receive the discharge of the relatively high pressure gross primary effluent stream from inner tubes 31 and 32 into the outlet passage 50 and allows the net primary effluent stream to be recovered from either opening 52 or 53, or simultaneously from both openings. The inlet passage 51 serves to introduce the high pressure gaseous feed stream into the apparatus. Thus, the gaseous feed stream may be introduced at either inlet opening 54 or 55, or simultaneously at both openings. Depending upon the particular locality where employed, the foregoing openings allow flexibility in the introduction and withdrawal of the gaseous streams. One specific arrangement is as shown in FIGS. 1, 2 and 3 wherein opposite ends from passage to passage are closed with plugs 56 and 57 (see FIGS. 2 and 3), thereby allowing the introduction of the gaseous feed stream on one side through opening 55, and the continuous withdrawal of the net primary stream from the other side through opening 53.

The manifold block contains two spaced threaded recesses 22 and 23 for receiving the lower threaded ends of the adsorbent vessels 20 and 21, with each recess having inner tube passages 60 and 61 with O-ring gaskets 62 and 63 (see FIGS. 4 and 5) located below the recess surface to provide a snug gas-tight fitting for the insertion of the lower projecting ends of the inner tubes. In direct gaseous communication with these inner tube passages 60 and 61 and directly below on the same center line and cutting into and through the outlet passage 50 are the recessed discharge chambers 64 and 65 of larger diameter than the inner tube passages, and threaded at the lower ends thereof for the insertion of threaded sealing plugs 66 and 67. (See FIGS. 4 and 5.) Offset from the inner tube passages and extending from each adsorption vessel recess are offset passages 68 and 69, which passages are in direct gaseous communication with the recessed upper valve chambers 70 and 71 having threaded lower ends 72 and 73 (see FIGS. 4 and 5) for the insertion of threaded valve means. The upper valve chambers have upper valve seats 74 and 75 having valve center passages 76 and 77 (see FIGS. 4, 5 and 9) which are in direct gaseous communication with the inlet passage 51. In commercial practice, manifold block 24 is quickly and economically constructed by drilling or molding the various internal passages and the upper valve and discharge chambers into a solid plastic or metal block.

It is recognized that in larger type installations wherein the diameter of the adsorption vessels exceed 24″ or even 12″, the upper valve chambers described need not actually be recessed in the manifold block itself, but may be more easily incorporated in the valve means secured, such as bolted, to the outside of the block. Where this arrangement is desired, the offset passages 68 and 69 together with the passages permitting gaseous communication between the inlet passage and the valve chambers 76 and 77 are placed in gaseous communication with the externally mounted valve chambers in the valve means. This arrangement does not, of course, alter the functional relationship or operations of the passages described.

*Unidirectional flow means*

Figure 10:
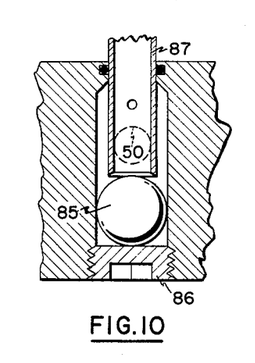
FIG. 10 is a sectional view of a modification of the unidirectional flow valve means of the apparatus of this invention.

Referring next to FIGS. 4 and 5, there is shown a particular unidirectional flow means comprising a check valve means, while referring to FIG. 10 there is shown a modification of the described check valve means. The unidirectional flow means or check valve described permits the discharge of the gross primary effluent from the lower ends of the central inner tubes 31 and 32 at a relatively high pressure into the discharge chambers 64 and 65, and then prevents this gaseous material from re-entering the adsorption zone from which it came when the particular zone is later opened to a region of relatively low pressure, i.e. is placed on the desorption cycle. When the adsorption vessel assemblies are threaded into the manifold block recesses 22 and 23, the open lower ends of the inner tubes project snugly in a gas-tight manner through the inner tube passages 60 and 61 and into the discharge chambers 64 and 65, which chambers are normally slightly larger in diameter than and directly beneath and communicate with the outlet passage 50. The particular unidirectional means employed comprises check valve means shown which includes spheres 80 and 81, preferably relatively smooth and solid, being slightly deformable and of rubber, nylon or similar light weight plastic, metal, or ceramic material inert to gaseous mixtures being processed to provide a positive gastight seal when located against the lower open ends of the inner tubes 31 and 32. The spheres are supported on and placed in positive compressive gas-tight contact with the open lower end of the inner tubes by check springs 82 and 83, which springs rest on the removable check valve threaded sealing plugs 66 and 67. These plugs provide support for the springs and permit rapid and easy access to the discharge chamber and the unidirectional flow means therein for replacement or repair purposes without disrupting any of the gaseous flow connections. The compressive character of the check retaining springs is just sufficient to support the weight of the sealing spheres, and to retain the spheres firmly in gas-tight contact against the open lower end of the inner tubes.

The compressive means employed should be such that the gross gaseous primary effluent at the preselected relatively high pressure when acting against the spheres, i.e. flowing down the inner tube of an adsorption vessel assembly when the assembly is on its high pressure or adsorption cycle, will depress the spheres sufficiently to allow the unrestricted flow of the gross primary effluent into the discharge chambers, while at the relatively low pressure of the secondary effluent, i.e. when the adsorption vessel assembly is on its low pressure or desorption cycle, the spheres will remain and be held in firm contact with the ends of the tubes. The lower ends of the inner tubes are usually deburred and bevelled internally or externally or both internally and externally to provide a gas-tight seating action of the spheres against the tube ends. As shown, the lower ends of the inner tubes project intermediately into the discharge chambers and usually slightly below the outlet passage. The check valve spheres or the terminal lower ends of the inner tubes may, of course, be located anywhere within the discharge chambers, so long as the gross primary effluent stream can be discharged into the discharge chamber and hence into the outlet passage. The location shown is usually preferred, since it prevents the spheres from being displaced by the direct high pressure flow of the primary effluent being discharged into the outlet passage from adjacent vessels. To permit the unrestricted flow of the net primary effluent, the discharge chambers are usually of larger diameter than the outlet passage so that the gross primary effluent stream may pass easily on either side of the inner tubes and spheres.

Although the check valve means described have employed springs to place the sealing spheres in position, it has been further discovered that by adjusting the tolerances between the opened ends of the inner tubes and the sealing spheres, the compressive means such as the springs may be wholly avoided. In one modification shown in FIG. 10, it is demonstrated that by allowing a sealing sphere 85 to rest on the check valve plug 86 with a small clearance, e.g. 1/16 to 1/4 inch, between the sphere and the open end of the inner tube 87 the sphere will be displaced by and permit the passage of the relatively high pressure gross primary effluent stream being discharged from the inner tube 87. The difference in pressure between the discharge chamber and the interior of the inner tube 87 when the adsorption zones and inner tubes are opened to the relatively low pressure creates a suction action, i.e. the relatively low desorption pressure within the inner tube 87 is less than the relatively high adsorption pressure in the surrounding discharge chamber, which pressure difference or suction action seats the sphere 85 against the lower open end of the inner tube 87 and thereby effectively seals the lower end of the inner tube in a gas-tight manner. Preferably, the degree of displacement allowed between the top of plug 86 and the sealing sphere 85 should be such as to provide an area of clearance approximately the open area of the lower end of the inner tube. For example, the clearance will normally range from 1/2 to 1/8, e.g. 1/4, the open diameter of the end of the inner tube, but may be smaller or larger as conditions permit. As shown in FIG. 10, the modified apparatus is on the high pressure cycle with the gross primary effluent at the relatively high pressure having depressed the sphere, and being discharged through the clearance between the sphere and the lower end of the tube into the discharge chamber and the outlet passage. Thus, if desired, compressive means to retain the spheres in contact with the open lower ends of the inner tubes are not needed during the operation of the apparatus. Besides the saving in the use of springs, this modification permits a manifold block of less depth to be used.

*The pressure reducing means*

Figure 11:
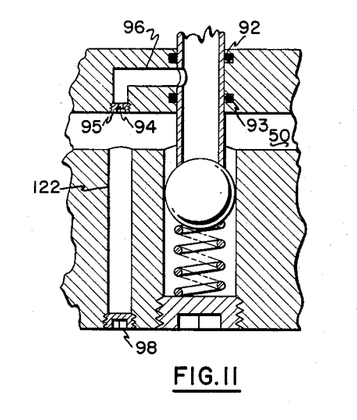
FIG. 11 is a sectional view of a modification of the pressure reducing means of the apparatus of this invention, this modification providing one method for changing the size of the pressure reducing orifice and being particularly suitable for larger type apparatus installations.
Figure 12:
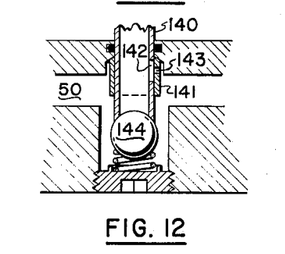
FIG. 12 is a sectional view of a modification of the pressure reducing means of the apparatus of this invention, this modification providing another method for changing the size of the pressure reducing orifice.

Referring next to FIGS. 4 and 5, there is shown a particular pressure reducing means; while referring to FIGS. 11 and 12, there are shown suggested modifications of the pressure reducing means. The pressure reducing means allows a portion of the relatively high pressure gross primary effluent stream to be introduced as a gaseous reflux stream at a relatively low pressure in a countercurrent direction upwardly through the inner tubes and through the saturated adsorption zones, when the adsorption zones previously on the relatively high pressure cycle are opened to a region of relatively low pressure. The pressure reducing means employed should be located or connected with or within the discharge chambers or outlet passage area, and may comprise pressure reducing valve means in larger type apparatuses, or preferably in the smaller apparatuses described be simply an orifice of suitable size in gaseous communication between the discharge chambers and the interiors of the inner tubes. In the walls of the lower end of the inner tubes below the O-ring sealing gaskets 62 and 63 are small pressure reducing orifices 90 and 91 which, for example, as shown are circular holes in direct gaseous communication between the interior of the inner tubes 31 and 32 and the discharge chambers 64 and 65 and the outlet passage 50. This orifice can be of any predetermined or preselected size or shape or number sufficient to allow for the proper preselected and desired drop in pressure of the reflux portion of the gross primary effluent stream when the reflux stream expands in going from the relatively high pressure of the discharge chambers to the relatively low pressure within the inner tubes.

When the pressure in the outlet passage 50 is relatively high due to the discharge of the gross primary effluent stream from the high pressure adsorption bed 30, as shown in FIG. 4, the orifice 91 permits a preselected reflux portion of the relatively high pressure gross primary effluent to expand through the orifice into the interior of the adjacent inner tube 31, and to then flow upwardly in this tube at a relatively low pressure within the adsorbent bed 29, which is then on the low pressure desorption cycle, i.e. is opened to a region of relatively low pressure as shown in FIG. 5. This action desorbs the one or more previously adsorbed key gaseous components and permits the reflux portion to be discharged as part of the gross secondary effluent. When the relatively high pressure gross primary effluent is being discharged from the inner tube 32, little, if any, of the high pressure effluent expands through the orifice 90 into the discharge chamber 64 due to the relatively high static pressure then existing within the discharge chamber 64; that is, there is little or no pressure difference between the interior and exterior of the inner tube 32. As shown, the circular orifices 90 and 91 are both located below the inner tube O-ring seals 62 and 63, and are drilled in the tube walls in the static pressure area above the outlet passage 50. Due to the possibility that location of the orifices directly in the gross primary effluent flow path in the outlet passage might not give the desired calculated pressure drop by virtue of the turbulent flow of the primary effluent about the adjacent tube 31 or 32, the pressure reducing orifices are usually placed in static pressure areas in the discharge chambers either somewhat above or below the outlet passage.

Although the pressure reducing means has been described in reference to pressure reducing orifices, it is within the scope of the instant invention that other pressure reducing means may be utilized, such as appropriate valve means and the like. Additionally, although the unidirectional flow means and the pressure reducing means have been separately described, it is within the contemplation of the instant invention that structural modifications may be incorporated into each particularly described means to serve both functions. For example, although the check valve spheres have been described to be smooth and solid, they may be hollow objects of varying shapes and sizes, for example, the pressure reducing orifices may be drilled through the spheres rather than in the walls of the inner tubes or central conduits 31 and 32. Further, the material employed can be of such gaseous permeability that although the spheres are properly seated, sufficient gas leakage occurs between or through the sphere and the interior of the tube that a pressure reducing effect is created. For example, the spheres might be constructed of molecular sieve material which would allow the interstitial passageways to perform the pressure reducing function, that is, serves as the pressure reducing orifice, while the total sphere itself would function as the check valve means.

One modification suitably combines both functions by the employment of a sphere, either hollow or solid, having a sintered, etched, crazed, serrated or otherwise roughened exterior surface. This roughness of the surface would be preselected so that the roughened sphere, on sealing the open lower end of an inner tube on the relatively low pressure cycle such as in FIG. 5, would still permit a predetermined amount of the gross primary effluent stream to serve as a reflux portion by expanding through the roughened crevices of the exterior surface into the interior of the tube. In this manner, a reduced number of or even no orifices at all would be required in the inner tubes, since the gas leakage between the roughened spheres and the lower ends of the inner tubes would accomplish both functions. Of course, the pressure reducing means can also be openings or notches placed at the lower edges of the lower ends of the inner tubes, so that the spheres will not completely seal the lower tube ends, but leaves sufficient gaseous openings for pressure reducing purposes.

In a larger type apparatus where removal of the adsorbent vessel assemblies is not easily achieved, the apparatus may be modified as in FIG. 11 to permit direct removal, replacement or repair of the pressure reducing means without removal of the larger size adsorbent vessel. In the modification shown in FIG. 11, a separate pressure reducing passage 122 is located in the manifold block, which passage has a gas sealing removable plug 98 at its lower end, and which passage is preferably in a direct line access communication with the outlet passage and a removable set valve plug 95. This valve plug is characterized by a pressure reducing orifice 94 which is in gas flow communcation with the interior of the inner tube of an adsorption vessel assembly through right angled passage 96 in the manifold block and an aligned hole in the tube wall. The inner tube is sealed in the manifold block by O-rings 92 and 93 respectively above and below the horizontal portion of passage 96. In this arrangement, easy access to the orifice plug is obtained through the pressure reducing passage, permitting orifice sizes to be changed rapidly as required without the need to remove the adsorbent vessel assembly or its inner central tube.

In another modification applicable where it is desirable to quickly switch from one size of pressure reducing means such as an orifice to another, and which is particularly suitable for larger type apparatus, the apparatus may be modified as in FIG. 12 to permit rapid replacement, removal, or repair of the pressure reducing means without removal of the adsorbent vessel assemblies or their inner tubes. In the modification of FIG. 12, a pressure reducing orifice 143 of predetermined size and shape as previously described is placed in the wall of a removable sleeve member 141. This sleeve member is open at both ends and adapted to be slid snugly or otherwise placed circumferentially in a gas-tight manner about an inner tube 140, which inner tube has an opening 142 in the lower wall thereof larger than any desired orifice size. The lower edge of the sleeve member shown is so located that it does not interfere with the proper seating closure of the spring supported sealing sphere 144. The sleeve member is normally composed of an extendable or semirigid or solid plastic material having a diameter equal to or slightly smaller than, but extendable to, the diameter of the inner tube 140 with which it is to be employed. Additionally, the sleeve may be of metal with modifications to permit a gas-tight fitting and rapid installation and removal of the metal sleeves. For example, metal sleeves with an elastomeric inner lining to provide a gas-tight inner seal to the exterior of the inner tube 140 may be usefully employed. Further, the lower end of the tube may be threaded and a threaded metal sleeve screwed on to the lower portion of the inner tube 140 and into the proper position, thereby providing a gas-tight seal with an easily removable metal sleeve.

In practice, the sleeve containing the desired orifice opening is slipped or otherwise placed in position, so that the orifice opening is in way of or aligned with the diameter or opening of the larger wall opening 142. Positioning is made easier by having a number of slots or openings like 142 to permit rapid positioning of the orifice or by the use of a marking or key position to permit the rapid alignment of the orifice over the wall opening 142. Thus, the removable sleeves with different orifices may be kept in stock and identified by color or other means, thereby allowing a rapid change in orifice sizes by entry to the discharge chamber through the removable discharge chamber plug. Further, the sleeve member may have a series of orifices of varying size located circumferentially about the sleeve and a change in the orifice effected by internal or external radial rotation of the sleeve member to a predetermined aligned position. In this situation, the sleeve member need not be removable, but may be permanently attached to the inner tube. Removal of the sleeve is accomplished by manual means or in smaller type appartus with the aid of tweezers or needle nose pliers or some other relatively flat holding and grasping tools, which will securely grasp the sleeve and permit its removal and replacement. In certain cases, it may be desired to place indented notches in the exterior wall of the sleeve so that the removing tool will have a particular firm location to grasp the sleeve when the sleeve is being removed.

When the pressure reducing orifice is desired to be located at a particular place, for example, not directly in the outlet passage flow path, the prelocation of the orifice to one side or the other can be accomplished by employing a detachable two-piece inner tube with the lower piece prepositioned within the manifold block in the desired orifice position and with the upper part of the inner tube removable as before, but in gas-tight communication with the lower tube when the adsorption vessel is screwed into the block recess.

*The flow-directing valve and timing means*

Figure 6:
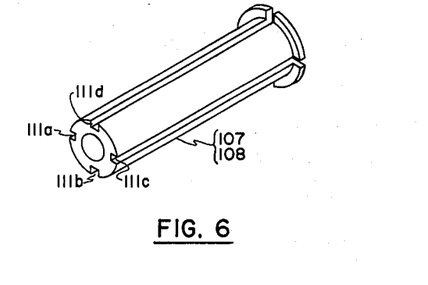
FIG. 6 is an isometric view of a fluted valve poppet employed in the power-operated valve means of the apparatus.

The flow-directing valve means is shown, in particular, in FIGS. 4, 5 and 6. Although manual operation would be posisble in theory, in any practical case and as illustrated, this valve means usually functions by power operation in conjunction with and responsive to a timing means whereby the flow-directing valve means permits the rapid cyclic and alternating introduction of the relatively high pressure gaseous feed stream into the lower portions of the beds of adsorbent material 29 and 30, and the discharge of the secondary effluent stream from the same portions of these beds to a region of relatively low pressure. The valve means preferably employed and as shown is an electrical solenoid valve means having a double seating action. This means comprises electrically energized coils 100 and 101 electrically connected and responsive to a timer 138 as shown in FIG. 1, which timer is connected to a suitable power source not shown. The coils surround valve bodies 102 and 103 which are threaded at their upper ends for gas tight attachment to the threaded upper valve chambers 70 and 71 in the underside of the manifold block. Sealing of the valve bodies against the manifold block is effected by O-ring gaskets 136 and 137. The valve bodies are also threaded at their lower ends to permit the mounting of coil shields 112 and 113 by retaining nuts 114 and 115.

Within the valve bodies are lower valve seats 104 and 105 for the lower valve chambers 117 and 118, which chambers, through the lower valve passages 106 and 116 which serve as secondary effluent passages, allow the secondary effluent stream to be intermittently and alternately discharged to a region of relatively low pressure. Mounted within the upper portions of valve bodies 102 and 103 are double seating and magnetically responsive valve poppets 107 and 108 having fluted passageways 111a, b, c, d as shown more particularly in a single isometric view in FIG. 6 representing both valve poppets. The upper central rubber sealing surfaces of the valve poppets are maintained firmly in gas-tight contact against the upper valve seats 74 and 75 in the manifold block by compressive means such as retaining springs 109 and 110 when no current is flowing in coils 100 and 101. In the nonenergized coil condition of the flow-directing valve means shown in FIG. 5, valve poppet 107 seals the outlet end of valve center passage 77 coming from inlet passage 51, thereby preventing the relatively high pressure feed stream from entering upper valve chamber 71 or the adsorbent bed 29, while opening the relatively saturated adsorbent bed 29 previously at the relatively high pressure to a region of relatively low pressure.

In the condition of the flow-directing valve means shown in FIG. 5 wherein the adsorbent material bed 29 is on its desorption cycle, the gross secondary effluent stream is being discharged from the adsorbent bed through the offset passage 69 to the upper valve chamber 71, from there through the fluted passages 111a, b, c, d of the valve poppet 107 into the lower valve chamber 117, and from there out the lower valve passage 116 to a region of relatively low pressure. Of course, as shown, the relatively low pressure is that of the atmosphere, but it can be less than atmospheric by the employment of a vaccum pump in communication with the secondary effluent valve passages 106 and 116, or more than atmospheric by discharging the secondary effluent stream to a separate operating apparatus or accumulator for gases or to another fractionating apparatus for gaseous mixtures as the relatively high pressure feed stream for the further fractional separation of other key components.

When a solenoid coil such as coil 100 is energized as shown in FIG. 4, the fluted poppet 108 responding to the magnetic field created by current flowing through the coil is retracted downwardly by the magnetic force, and overcomes the compressive force of the spring 110 to come to rest upon and to seal the lower valve seat 118, while breaking its former seal to the upper valve seat 74 to open passage 76. This permits the introduction of the relatively high pressure gaseous feed stream into the upper valve chamber 70, from which chamber the feed stream flows upwardly through the offset passage 68 and further upwardly while still at a relatively high pressure through the adsorbent bed 30.

The timing means 138 controls the cyclic and alternating sequence of the flow-directing valve operation, and can be any suitable timing mechanism with a preset cycle time or a selected variable cycle time available across a range of, for example, 1 to 120 seconds, or, a narrower range of 30 to 60 seconds. A suitable timing means comprises an electrically powered motor with a cam shaft to operate electrical switches mechanically in a preselected timing sequence, which switches are connected to and operate electrically the flow-directing valve means described.

*Operation of the apparatus*

Although the apparatus of the present invention may be employed advantageously for the fractional adsorption and separation of a wide variety of gases and vapors, such as oxygen from nitrogen, hydrogen from natural and petroleum gases, and the like, the operation of the preferred two-vessel apparatus as shown particularly in FIGS. 4 and 5 will be described with reference to the removal of water vapor from air to obtain air having a very low moisture content, i.e. less than 50 p.p.m. of water vapor, e.g. 5 to 15 p.p.m. of water vapor.

In the operation of the two-vessel apparatus, wet air containing, for example, from 100 to 10,000 p.p.m. of water vapor, is supplied at a relatively high pressure such as one in the range 40 to 150 p.s.i.g. from an air compressor or other source. An exemplary particular supply pressure would be 100 p.s.i.g. The flow-directing valve and timing means, taken as operating from an electrical power source at 110 A.C. volts, is set for an exemplary cycle time lenth of between 20 seconds and 200 seconds, for instance, 60 seconds. The timer will then alternately and cyclically energize and de-energize the solenoid valve coils 100 and 101. When solenoid valve coil 100 is energized, for example, the magnetic field created operates to overcome the force of valve spring 110 and depress fluted valve poppet 108, thereby permitting the wet high pressure air feed stream to enter upper valve chamber 70 via upper valve chamber passage 76, and then to enter the lower portion of adsorbent bed 30 through offset passage 68 extending from valve chamber 70 to the lower end of adsorption vessel 20 as shown in FIG. 4.

The wet high pressure air passes upwardly through adsorbent bed 30 comprising, for example, an adsorbent material such as 8 x 12 wire mesh (pellet size) molecular sieves having a pore size of 4 Angstrom units, but which may also be either alumina, charcoal, silica gel, and the like, or other suitable adsorbent material having a selected affinity for water vapor, i.e. water vapor being the key componnet. As the wet air travels upwardly through the bed, an upwardly moving dynamic adsorption front is established as described in the Skarstrom patent. It should be noted in this connection that employment of inner center tube or conduit 32 is additionally advantageous in that it reduces the overall curvature or sharpness of the moving front as compared to that existing in a conduit-free bed, thereby permitting greater utilization of the adsorption path before breakthrough of the moisture adsorption front, i.e. before the front containing the adsorbed moisture reaches perforations 33a, b, c, d, etc., in the upper portion of inner tube 32.

The air arriving at the upper end of adsorbent bed 30 at substantially the initial relatively high pressure of the original feed stream and now containing only from 5 to 15 p.p.m. of water vapor, the greater part of the original water vapor or key component content of the feed stream having been selectively adsorbed at the high pressure on the adsorbent bed, passes without any significant drop in pressure through the impregnated felt filter sleeve 34 and the perforations 33a, b, c, d, etc., in the upper portion of inner tube 32. This dry air still at substantially the relatively high feed stream pressure then passes downwardly through the inner tube or central conduit 32. Little or no high pressure dry air passes from the interior of inner tube 32 through pressure reducing orifice 90 into discharge chamber 64. Rather, the dry high pressure air depresses check valve sealing sphere 80 at the lower end of the inner tube, thereby permitting the dry high pressure air, i.e. the gross primary effluent, to enter discharge chamber 64 and outlet passage 50. The dry high pressure air then passes around center conduit 31 of the adjacent adsorption vessel 21, and at least a portion of it, usually a substantial portion, is finally discharged from outlet passage opening 53 as the net primary effluent stream. The operation thus far described constitutes the high pressure adsorption cycle of one adsorption vessel assembly, specifically that one including adsorbent bed 30, and then recites flow of relatively high pressure air with check valve sealing sphere 80 and solenoid valve poppet 108 being in their positions shown in FIG. 4.

While one adsorption vessel assembly is on a high pressure or adsorption cycle, the other assembly is on a low pressure or desorption cycle as shown in FIG. 5. Supposing that the adsorption vessel assembly of FIG. 5 has been on a high pressure cycle prior to the moisture front in adsorbent bed 29 reaching the perforated upper portion of inner tube 31, i.e. before the then high pressure adsorbent bed becomes fully saturated with the key component or prior to breakthrough, the timing means de-energizes solenoid valve coil 101. With the de-energization of this coil, valve spring 109 is able to expand and thus cause valve poppet 107 to rise and seat against upper valve seat 75 and stop the inlet flow of wet air, while simultaneously opening the upper end of lower valve passage 116 to place lower valve chamber 117 in communication with a region of relatively low pressure such as the atmosphere. The nearly saturated adsorption bed previously on the high pressure cycle then desorbs in a direction counter to that of gas flow through the bed during its previous cycle. The interior region of inner tube 31 falls in pressure allowing check valve spring 83 to expand and reseat check valve sphere 81 on the open end of the center tube. With the seating of this valve sphere, pressure in the interior region of inner tube 31 continues to fall until it reaches a value not substantially higher than that of the region with which lower valve chamber 117 is in communication through lower valve passage 116.

The pressure difference now existing between the interior region of inner tube 31 and outlet passage 50 causes a preselected portion of the gross primary effluent, i.e. the dry relatively high pressure air in the outlet passage emanating from the adjacent adsorbent bed 30 on the high pressure cycle, which is flowing past the portion of inner tube 31 extending into discharge chamber 65 to expand through orifice 91, and pass upwardly within inner tube 31 and then downwardly through adsorbent bed 29, thereby purging this adsorbent bed at the relatively low pressure. The purge or reflux portion of the gross primary effluent and the desorbed key components previously adsorbed at the relatively high pressure comprising together the gross secondary effluent and containing the key component water vapor in concentration higher than that in the feed stream, is then discharged through offset passage 69, upper valve chamber 71, fluted passages 111a, b, c, d of valve poppet 107, lower valve chamber 117 and lower valve passage 116 into the atmosphere or other region of relatively low pressure. The operation just described constitutes the low pressure desorption cycle of one adsorption vessel assembly, specifically that one including adsorbent bed 29, and recites the flow of relatively low pressure air with the check valve sealing sphere 81 and solenoid valve poppet 107 being in their positions shown in FIG. 5. When the adsorbent bed 29 is substantially fully desorbed, the cycle reverses or alternates with coil 101 being energized and the desorbed adsorbent vessel assembly previously on the low pressure or desorption cycle being placed on a high pressure or adsorption cycle. At substantially the same time solenoid valve coil 100 is de-energized, and the adsorption vessel assembly including adsorbent bed 30 is placed on a low pressure or desorption cycle. The described FIGS. 4 and 5 illustrate the positions of valve elements when one adsorption vessel assembly is on the high pressure and the other assembly is on the low pressure cycle, and illustrate additionally the corresponding directions of gas flow within the adsorption vessel assemblies and other portions of structure.

The apparatus of this invention in its preferred embodiment has been discussed with particular reference to the "heatless" fractionation process; but it is, of course, apparent to those skilled in the art that the instantly described apparatus may be employed successfully with structural modifications or additions such as heating or cooling means for the adsorbent beds, with other gaseous fractionating processes, and in combination with other fractionating apparatuses and related structures.

The inventive apparatus has been described with non-limiting specific arrangements and modes of operation, and at least some modifications of it within the capabilities of a person skilled in the art are contemplated, that is, modifications within the scope of the appended claims.

I claim as my invention:

1. An apparatus for fractionating gaseous mixtures, said apparatus comprising in combination:
    (1) A manifold structure including a manifold block and characterized by
        (a) An inlet passage for the introduction of a gaseous mixture feed stream at a relatively high pressure,
        (b) An outlet passage for the discharge of a gaseous net primary effluent stream,
        (c) A discharge chamber in communication with the outlet passage,
        (d) A valve chamber in communication with the inlet passage,
        (e) An upwardly-extending passage in communication with the valve chamber, and
        (f) A secondary effluent passage in communication with the valve chamber, and adapted to have communication with a region of relatively low pressure for the discharge of a gaseous gross secondary effluent stream thereinto;
    (2) An adsorption vessel assembly including
        (a) An elongated vessel closed at its upper end and mounted in a gas-tight manner at its lower end to the block of said manifold structure and in communication with the upwardly-extending passage from the valve chamber thereof,
        (b) A bed of adsorbent material within the elongated vessel, this material having a selective affinity for at least one key component of a gaseous mixture feed stream, and
        (c) A vertically disposed conduit within the elongated vessel, this conduit being characterized by sufficient opening area at its upper end to permit the flow of gases between its interior and the bed of adsorbent material without a significant drop in pressure, and connected at its lower end in gas flow communication with the discharge chamber of said manifold structure;
    (3) Unidirectional flow means adapted to permit a gaseous gross primary effluent stream at a relatively high pressure to be discharged from the lower end of the vertically disposed conduit of said adsorption vessel assembly when the bed of adsorbent material thereof is on a relatively high pressure adsorption cycle, and to seal the lower end of the vertically disposed conduit when said bed of adsorbent material is on a relatively low pressure desorption cycle;
    (4) Pressure reducing means interconnecting at an inlet end thereof said primary effluent stream material at a relatively high discharge pressure and at an outlet end said vertically disposed conduit to introduce a reflux stream of a gaseous primary effluent material into the interior of the vertically disposed conduit of said adsorption vessel assembly during a time when the bed of adsorbent material thereof is in communication with a region of relatively low pressure, and
    (5) Flow directing means adapted for operation to alternately and cyclically
        (a) Permit the flow of a gaseous mixture feed stream at a relatively high pressure from the inlet passage of said manifold structure into the valve chamber thereof, and from there through the communicating upwardly-extending passage and into the lower end of the bed of adsorbent material of said adsorption vessel assembly; seal the secondary effluent passage, and thereby place the bed of adsorbent material on a relatively high pressure adsorption cycle, and after a preselected time interval,
        (b) Prohibit the flow of the gaseous mixture feed stream into the valve chamber and open the secondary effluent passage to a region of relatively low pressure, thereby allowing a gaseous gross secondary effluent stream to flow from the bed of adsorbent material, said secondary effluent stream emanating from said discharge chamber through the introduction of gaseous primary effluent stream material at an initially relatively high pressure through said pressure reducing means into said vertically disposed conduit, through the upper end thereof to said bed and downwardly to and through the upwardly-extending passage of the manifold structure communicating with the valve chamber thereof, into the valve chamber, and from there through the secondary effluent passage to the region of relatively low pressure, thus placing the bed of adsorbent material on a relatively low pressure cycle and effecting the discharge of gaseous gross secondary effluent material, said apparatus thus being capable of effecting the intermittent fractionation of a gaseous mixture feed stream into a relatively high pressure gaseous net primary effluent stream discharging from the outlet passage of said manifold structure and a relatively low pressure gaseous gross secondary effluent stream discharging from the secondary effluent passage, said net primary effluent stream and said gross secondary effluent stream having at least one key component in less and greater concentration respectively than that in which it is present in said feed stream.

2. An apparatus according to claim 1 in which said adsorption vessel assembly is detachably mounted to and removable from said manifold structure.

3. An apparatus according to claim 1 which further comprises power-operated timing means connected to and adapted to effect cyclical operation of said flow directing means.

4. An apparatus according to claim 1 in which said undirectional flow means comprises resilient means and a sphere located within the discharge chamber of said manifold structure below the lower end of the vertically disposed conduit of said adsorption vessel assembly, said resilient means acting upon said sphere in a direction tending to seat the sphere against the lower end of the vertically disposed conduit.

5. An apparatus according to claim 1 in which said unidirectional flow means comprises a sphere located within the discharge chamber of said manifold structure and, in the absence of unbalanced gas pressures exerted upon it, at a predetermined distance below the lower end of the vertically disposed conduit of said adsorption vessel assembly, this sphere rising and seating against the lower end of the vertically disposed conduit in response to a pressure difference existing between the interior thereof and the discharge chamber when the bed of adsorbent material of said adsorption vessel assembly is on a relatively low pressure desorption cycle, and falling from the lower end of the vertically disposed conduit to permit flow therefrom of a relatively high pressure gaseous gross primary effluent stream when the bed of adsorbent material is on a relatively high pressure adsorption cycle.

6. An apparatus according to claim 1 in which said pressure reducing means comprises a restricted passage communicating at its outlet end with said vertically disposed conduit.

7. An apparatus according to claim 1 in which said pressure reducing means is located in the wall of the vertically disposed conduit of said adsorption vessel assembly and comprises a portion of the wall formed with a restricted passage therethrough near the lower end of the vertically disposed conduit and within the discharge chamber of said manifold structure.

8. An apparatus according to claim 1 in which said pressure reducing means is combined with said unidirectional flow means.

9. An apparatus according to claim 1 in which the vertically disposed conduit of said adsorption vessel assembly is located substantially centrally within the elongated vessel thereof.

10. An apparatus according to claim 1 in which said manifold structure is characterized further by a pressure reducing passage extending from an exterior end wherethrough access is provided to said pressure reducing means, said pressure reducing passage having an externally removable sealing means.

11. An apparatus according to claim 1 in which said manifold structure is characterized further by a pressure reducing passage adapted to provide access to said pressure reducing means, this passage extending from an exterior end at the surface of the block of said structure to intersect the outlet passage thereof and terminate at an interior end in communication with the interior of the vertically disposed conduit of said adsorption vessel assembly; which apparatus comprises further a removable sealing means at the exterior end of said pressure reducing passage, and in which apparatus said pressure reducing means comprises an orifice plug located in said pressure reducing passage between the intersection of this passage with the outlet passage and its interior end.

12. An apparatus according to claim 1 in which said pressure reducing means is formed by the vertically disposed conduit of said adsorption vessel assembly having a portion provided with an enlarged opening in its wall near its lower end and within the discharge chamber of said manifold structure, and a sleeve member being fitted about the lower end of the vertically disposed conduit and characterized by a restricted orifice aligned with the enlarged opening in said conduit.

13. An apparatus according to claim 1 in which said flow directing means comprises a spring loaded solenoid operated, fluted poppet type, double seating valve, said valve, when the solenoid is deenergized prohibiting the flow of the gaseous mixture feed stream into the valve chamber of said manifold structure and opening the secondary effluent passage thereof to a region of relatively low pressure.

14. An apparatus for fractionating gaseous mixtures, said apparatus comprising in combination:
(1) A manifold structure including a manifold block and characterized by
(a) An inlet passage for the introduction of a gaseous mixture feed stream at a relatively high pressure,
(b) An outlet passage for the discharge of a gaseous net primary effluent stream,
(c) A discharge chamber in communication with the outlet passage,
(d) A valve chamber in communication with the inlet passage,
(e) An upwardly-extending passage in communication with the valve chamber, and
(f) A secondary effluent passage in communication with the valve chamber, and adapted to have communication with a region of relatively low pressure for the discharge of a gaseous gross secondary effluent stream thereinto;
(2) An adsorption vessel assembly detachably mounted to and removable from said manifold structure, which adsorption vessel assembly includes
(a) An elongated vessel closed at its upper end and mounted in a gas-tight manner at its lower end to the block of said manifold structure and in communication with the upwardly-extending passage from the valve chamber thereof,
(b) A bed of adsorbent material within the elongated vessel, this material having a selective affinity for at least one key component of a gaseous mixture feed stream, and
(c) A vertically disposed conduit located substantially centrally within the elongated vessel, this conduit being characterized by sufficient opening area at its upper end to permit the flow of gases between its interior and the bed of adsorbent material without a significant drop in pressure, and near its lower end by an area having a restricted passage therethrough forming a pressure reducing orifice located in its wall, its lower end including said passage area being inserted in a gas-tight manner into the discharge chamber of said manifold structure;
(3) Unidirectional flow means comprising resilient means and a sphere located within the discharge chamber of said manifold structure below the lower end of the vertically disposed conduit of said adsorption vessel assembly, said resilient means acting upon said sphere in a direction tending to seat the sphere against the lower end of the vertically disposed conduit;
(4) Flow directing means adapted for operation to alternately and cyclically
(a) Permit the flow of a gaseous mixture feed stream at a relatively high pressure from the inlet passage of said manifold structure into the valve chamber thereof, and from there through the communicating upwardly-extending passage and into the lower end of the bed of adsorbent material of said adsorption vessel assembly; seal the secondary effluent passage, and thereby place the bed of adsorbent material on a relatively high pressure adsorption cycle, and after a preselected time interval
(b) Prohibit the flow of the gaseous mixture feed stream into the valve chamber and open the secondary effluent passage to a region of relatively low pressure, thereby allowing a gaseous gross secondary effluent stream to flow from the bed of adsorbent material, said secondary effluent stream emanating from said discharge chamber through the introduction of gaseous primary effluent stream material at an initially relatively high pressure through said pressure reducing orifice into said vertically disposed conduit, through the upper end thereof to said bed and downwardly to and through the upwardly-extending passage of the manifold structure communicating with the valve chamber thereof, into the valve chamber, and from there through the secondary effluent passage to the region of relatively low pressure, thus placing the bed of adsorbent material on a relatively low pressure cycle and effecting the discharge of gaseous gross secondary effluent material, and (5) Power operated timing means connected to and adapted to effect cyclical operation of said flow directing means, said apparatus thus being capable of effecting the intermittent fractionation of a gaseous mixture feed stream into a relatively high pressure gaseous net primary effluent stream discharging from the outlet passage of said manifold structure and a relatively low pressure gaseous gross secondary effluent stream discharging from the secondary effluent passage, said net primary effluent stream and said gross secondary effluent stream having at least one key component in less and greater concentration respectively than that in which it is present in said feed stream.

15. An apparatus for fractionating gaseous mixtures, said apparatus comprising in combination:
(1) A manifold structure including a manifold block and characterized by
   (a) An inlet passage for the introduction of a gaseous mixture feed stream at a relatively high pressure,
   (b) An outlet passage for the discharge of a gaseous net primary effluent stream,
   (c) First and second discharge chambers in separate communication with the outlet passage,
   (d) First and second valve chambers in separate communication with the inlet passage,
   (e) First and second upwardly-extending passages in communication with the first and second valve chambers respectively, and
   (f) First and second secondary effluent passages in communication with the first and second valve chambers respectively, and each adapted to have communication with a region of relatively low pressure for the discharge of a gaseous gross secondary effluent stream thereinto;
(2) First and second adsorption vessel assemblies each including
   (a) An elongated vessel closed at its upper end and mounted in a gas-tight manner at its lower end to the block of said manifold structure and in communication with a correspondingly-designated upwardly-extending passage from a correspondingly-designated valve chamber thereof,
   (b) A bed of adsorbent material within the elongated vessel, this material having a selective affinity for at least one key component of a gaseous mixture feed stream, and
   (c) A vertically disposed conduit within the elongated vessel, this conduit being characterized by sufficient opening area at its upper end to permit the flow of gases between its interior and the bed of adsorbent material without a significant drop in pressure, and connected at its lower end in gas flow communication with a correspondingly-designated discharge chamber of said manifold structure;
(3) First and second unidirectional flow means each adapted to permit a gaseous gross primary effluent stream at a relatively high pressure to be discharged from the lower end of the vertically disposed conduit of the correspondingly-designated adsorption vessel assembly when the bed of adsorbent material thereof is on a relatively high pressure adsorption cycle, and to seal the lower end of the vertically disposed conduit when said bed of adsorbent material is on a relatively low pressure desorption cycle;
(4) First and second pressure reducing means each interconnecting at a correspondingly designated inlet end thereof said primary effluent stream material under a relatively high discharge pressure and at a correspondingly designated outlet end the correspondingly designated vertically disposed conduit to introduce a reflux stream of a gaseous primary effluent material into the interior of the vertically disposed conduit of the correspondingly-designated adsorption vessel assembly during a time when the bed of adsorbent material thereof is in communication with a region of relatively low pressure, and
(5) First and second flow directing means each adapted for operation to alternately and cyclically
   (a) Permit the flow of a gaseous mixture feed stream at a relatively high pressure from the inlet passage of said manifold structure into the correspondingly-designated valve chamber thereof, and from there through the communicating upwardly-extending passage and into the lower end of the bed of adsorbent material of the correspondingly-designated adsorption vessel assembly; seal the correspondingly-designated secondary effluent passage, and thereby place the bed of adsorbent material on a relatively high pressure adsorption cycle, and after a preselected time interval
   (b) Prohibit the flow of the gaseous mixture feed stream into the valve chamber and open the secondary effluent passage to a region of relatively low pressure, thereby allowing a gaseous gross secondary effluent stream to flow from the bed of adsorbent material, said secondary effluent stream emanating from said discharge chamber through the introduction of gaseous primary effluent stream material at an initially relatively high pressure through said pressure reducing orifice into said vertically disposed conduit, through the upper end thereof to said bed and downwardly to and through the upwardly-extending passage of the manifold structure communicating with the correspondingly-designated valve chamber thereof, into the valve chamber, and from there through the secondary effluent passage to the region of relatively low pressure, thus placing the bed of adsorbent material on a relatively low pressure cycle and effecting the discharge of gaseous gross secondary effluent material,
and said first and second flow directing means being further adapted for operation of the adsorption and desorption cycles of one vessel in a sequence opposed to that of the other vessel, said apparatus thus being capable of effecting the continuous fractionation of a gaseous mixture feed stream into a relatively high pressure gaseous net primary effluent stream discharging from the outlet passage of said manifold structure and a relatively low pressure gaseous gross secondary effluent stream discharging alternately from said first and second secondary effluent passages, said net primary effluent stream and said gross secondary effluent stream having at least one key component in less and greater concentration respectively than that in which it is present in said feed stream.

16. An adsorption vessel assembly which comprises
(1) An elongated cylindrical vessel having one end and another end, said vessel being closed at its one end and open at its other end across the full cross sectional area defined by the vessel wall and having engageable means at said open end of the vessel wall for removably securing said vessel in a mounted condition;
(2) A bed of adsorbent material within said elongated vessel extending at least close to the one end thereof and substantially filling the interior of said vessel throughout the extent of the bed and a permeable bed support removably mounted on the interior wall of the vessel and defining an end of the bed adjacent said open end, and,
(3) A conduit centrally disposed longitudinally within said elongated vessel and penetrating said bed of adsorbent material and passing through said bed support in slidable relation thereto, said conduit being characterized by
  (a) An outside diameter in co-axial relation with said elongated vessel and substantially less than the inside diameter of said elongated vessel,
  (b) One end at least close to the one end of said elongated vessel,
  (c) Another end being open adjacent said open end of the vessel and beyond said bed of adsorbent material in a direction away from the one end of said elongated vessel, and
  (d) Sufficient opening area near its one end to permit the flow of gases between its interior and the bed of adsorbent material without a significant drop in pressure, whereby said assembly of elongated vessel and coaxially related conduit may be turned together by a single rotary action for mounting said assembly and the simultaneous connection of co-axial ports for said open ends of the conduit and vessel respectively.

17. An adsorption vessel assembly according to claim 16 in which said conduit is characterized further by a wall portion provided with an orifice located beyond said bed of adsorbent material in a direction away from the one end of said elongated vessel.

18. An adsorption vessel assembly according to claim 16 which comprises additionally resilient means acting on said removable support whereby said bed of adsorbent material is maintained in a compressed condition.

19. An adsorption vessel assembly according to claim 16 which comprises additionally at least one retaining device for embracing and positioning said conduit in said vessel, said retaining device extending substantially radially from said conduit into said bed of adsorbent material and presenting a substantial surface area to the material of said bed in a direction transverse to the longitudinal disposition of said conduit while leaving a substantially unimpeded path within said bed of adsorbent material for the flow of gases therethrough in a direction parallel to the longitudinal disposition of said conduit.

References Cited by the Examiner

UNITED STATES PATENTS

| | | | |
|---|---|---|---|
| 2,160,003 | 5/1939 | Slayter | 55—491 |
| 2,283,989 | 5/1942 | Henry | 55—74 |
| 2,593,132 | 4/1952 | Gannon | 55—387 |
| 2,944,627 | 7/1960 | Skarstrom | 55—33 |

FOREIGN PATENTS 852,538   10/1952   Germany.

FRANK W. LUTTER, *Primary Examiner.*

HARRY B. THORNTON, *Examiner.*